Nov. 5, 1968  R. M. KING  3,408,704
SEPARABLE FASTENER

Filed Sept. 19, 1966　　2 Sheets-Sheet 1

INVENTOR
ROGER MILNER KING
By
Cushman, Darby & Cushman
ATTORNEYS

Nov. 5, 1968

R. M. KING 3,408,704

SEPARABLE FASTENER

Filed Sept. 19, 1966

INVENTOR
ROGER MILNER KING

BY Cushman Darby & Cushman
ATTORNEYS

United States Patent Office 3,408,704
Patented Nov. 5, 1968

3,408,704
SEPARABLE FASTENER
Roger Milner King, White Hill House, Batchworth Heath, Rickmansworth, Hertfordshire, England
Filed Sept. 19, 1966, Ser. No. 580,515
Claims priority, application Great Britain, Sept. 20, 1965, 39,949/65
6 Claims. (Cl. 24—201)

ABSTRACT OF THE DISCLOSURE

A clasp for joining together the two ends of a loop member such as a wrist band or a safety belt comprising two interengaging portions, one of which carries a single tongue member which engages with and is fully enclosed by a groove in the other portion. A safety catch is pivotally mounted on one end of one of the clasp portions to close and catch over the top of the two portions.

---

This invention is concerned with improvements in or relating to clasps. More especially, it is concerned with improvements in or relating to two-part clasps for fastening together two ends of a loop member to each of which is secured one part of the clasp. The loop member may, for example, be a flexible metal soldered or pinned to each part of the clasp, and which, for instance, might constitute a necklace or a wristband (e.g. a bracelet or watchstrap), or it may, for example, be a webbing strap which for instance might constitute a waistbelt or safety belt for the occupant of an automobile or other land vehicle or flying vehicle, such as an airplane, helicopter, hovercraft or spacecraft.

Many types of clasp are known fastening together the ends of loop members, and they are generally formed of two interlocking portions, each of which is attached to one end of the loop member. Unfortunately, the known clasps are prone to become disengaged when accidentally touched, for example by being caught on clothing or rubbed against furniture.

This disadvantage has been appreciated and it has been proposed to secure the clasp in firm engagement by hinging a safety catch between it and the loop member, for example a bracelet. Such an arrangement is, however, functionally disadvantageous and the overall effect is aesthetically unpleasing.

Yet another disadvantage is that known clasps are of an elaborate construction which involves high production costs.

It is an object of this invention to provide an improved clasp for fastening the ends of a loop member.

It is another object of this invention to provide a clasp for use in combination with a loop member, which clasp is of a simple and aesthetically pleasing construction and yet has only a minimal risk of becoming disengaged accidentally.

Another object of this invention is to provide a clasp in which the safety catch is hinged to the clasp itself.

Another object is to provide a clasp, the interlocking portions of which may be engaged and disengaged by being moved towards and away from each other instead of being slid over each other, the movement involved being a simple vertical movement which positively locates the two parts of the clasp in the engaged position and not a lateral or side movement.

Yet another object of this invention is to provide a combination of the improved clasp herein disclosed and a loop member.

These and other objects of the invention will be apparent from the following description and the accompanying drawings.

The objects of this invention are secured by using a clasp comprising two interlocking portions, each said portion being provided at one end with means adapted for connection to one end of a loop member, at least one said portion having a tongue member projecting therefrom at a point remote from said one end and inclined at an acute angle from the upper or lower surface of that portion towards said one end thereof, the other portion having walls defining a complementary groove to accommodate said tongue member, and a guard mounted pivotally upon one of the portions at said one end and arranged to shut and lock over the two clasp portions when in engagement.

It is preferred that there should be a tongue member and a complementary groove on each of the two interlocking portions so that, for instance, both portions have exactly the same construction and are precise complements of one another. Preferably the two complementary portions are so formed that when interlocked they are in the general form of a solid rectangle.

It will be appreciated that a pull on the ends of a clasp by the loop member seeks to separate the clasp but such a tendency is rendered ineffective here because, to be opened, the two portions of the clasp must be moved towards one another, thus against the pull exerted by the loop member. However, to ensure even greater safety, a safety catch is incorporated in the clasp which takes the form of a guard pivotally mounted at the one end of one of the portions of the clasp and arranged to shut and lock over the upper and side surfaces of the two clasp portions.

The guard is preferably formed as a main flap portion to cover most of the upper and side surfaces of the clasp portion. The locking means between the guard and the clasp portions can comprise studs or indentations or holes on the inner surface of the arms of the guard co-operating with indentations or holes or studs respectively on the sides of the clasp portion(s). A similar locking means can also be provided for locking the guard in an open position to allow disengagement of the two clasp portions.

The invention will be more fully understood from the accompanying drawings, which are given by way of illustration only and in which.

Figure 1:
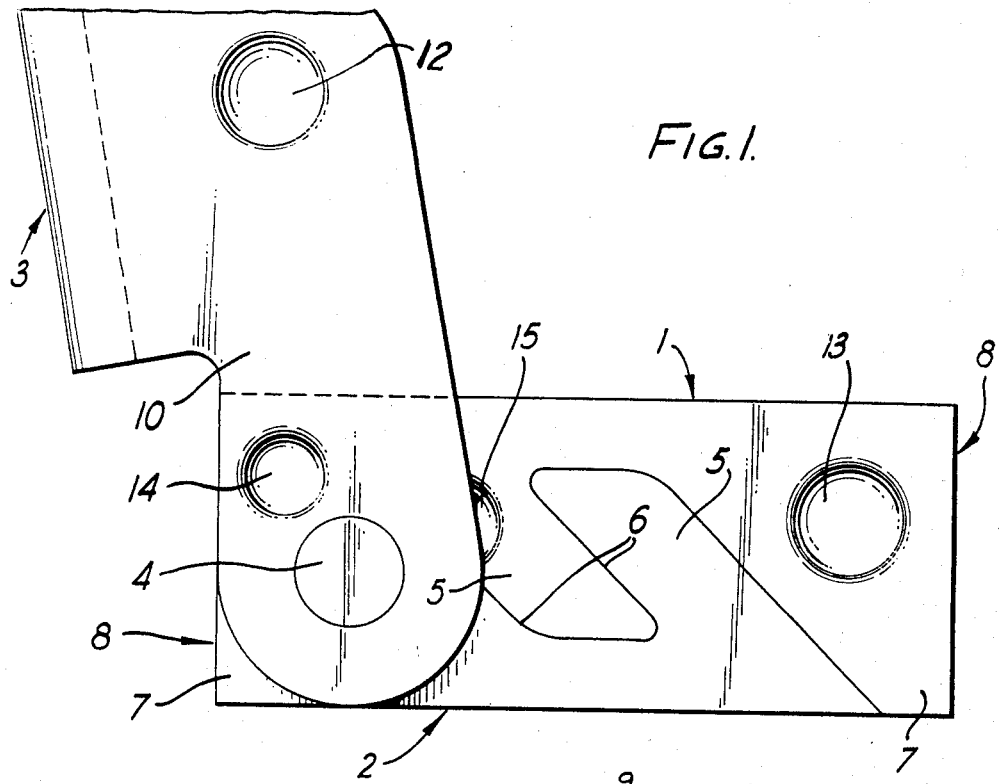
FIGURE 1 is a side view of a preferred form of clasp.
Figure 2:
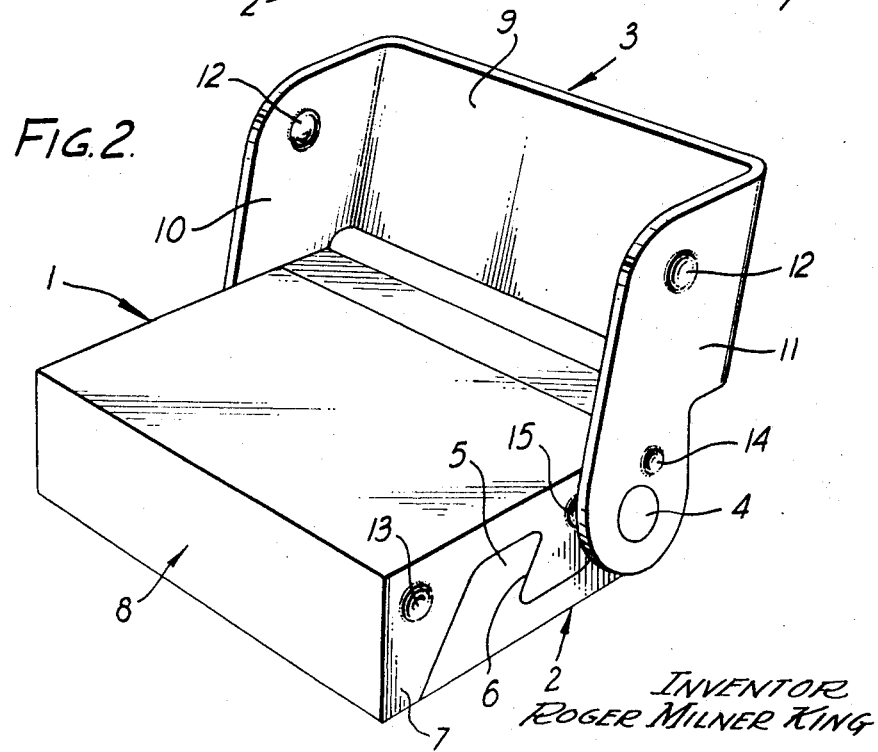
FIGURE 2 is a perspective view from above and the other side of the clasp shown in FIGURE 1.
Figure 3:
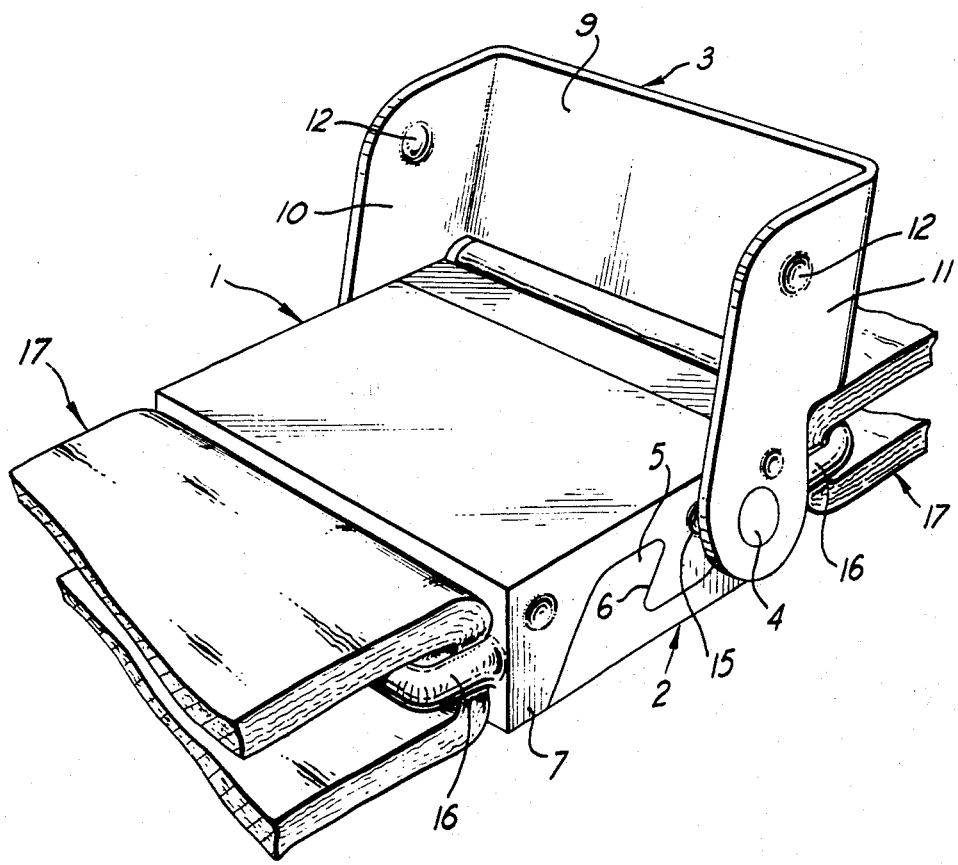
FIGURE 3 is a perspective view from above according to FIGURE 2 but showing the combination of a clasp and a loop member.

The clasp shown in FIGURES 1, 2 and 3 essentially comprises two clasp portions 1, 2 together with a guard 3 pivotally mounted on one of the two portions, as shown, on portion 2 by a hinge pin 4 passing through the guard and portion 2. Each clasp portion 1, 2 carries a tongue member 5 which interlocks within a complementary groove 6 formed in the clasp portion between tongue 5 and the main body 7 thereof. The two portions 1, 2 may be united by sliding one down on to the other, using arms 10, 11 (subsequently to be mentioned) as guides. The opposite ends of a loop member (not shown in FIGURES 1 and 2) may be secured to the end 8 of each of the main bodies 7 of clasp portions 1, 2 by any appropriate and convenient means, such as by direct soldering, connection to hooks or eyes secured to ends 8 etc., but more details of this will be given in the description of FIGURE 3.

The guard 3 consists of a flap portion 9 between two arms 10, 11 which pivot about pin 4 and are arranged to enclose the sides of clasp portions 1, 2 and prevent lateral movement therebetween when guard 3 is closed. The flap portion 9 prevents disengagement of the two clasp portions 1, 2 when guard 3 is closed.

One important feature of guard 3 is that it is hinged by the pin 4 passing through the main body 7 of the clasp portion 2 thus forming an integral part of the clasp as a complete component, thereby avoiding the necessity of having a safety catch hinged to a part of the loop member, for example a bracelet, necklace or the like, to be connected on either side of the clasp as is normal with standard clasp arrangements. In order to hold guard 3 in the closed position, arms 10, 11 are each provided with studs 12 which co-act with indentations or holes 13 of main body 7 of clasp member 1 by a snap-action when guard 3 is closed. Similar studs 14 co-act with indentations 15 to aid in securing guard 3 in the closed position. The studs 14 do however have an additional effect in that they co-act with further indentations (not visible) in main body 7 of clasp portion 2 to hold the guard 3 in the open position shown in FIGURES 1 and 2.

While it is preferred that the two portions 1, 2 should be of the symmetrical attractive form shown in the drawings, they could take other forms such that, for instance, one of the clasp portions could consist of a flat plate with a downwardly projecting, acutely angled, tongue member which co-operates with a corresponding groove in the upper surface of the other clasp portion. Also, if each clasp portion carries a tongue and groove, the two clasp portions need not necessarily be identical to one another provided that they can mutually interlock in the manner described.

Referring now to FIGURE 3, this shows the clasp of FIGURES 1 and 2 provided with a loop member, in this case a car safety belt. Each end 8 of interlocking portions 1, 2 has an angle bar 16 soldered thereon and a safety belt 17 passes around the bar, the other ends of the belt being provided with adjustable buckles (not shown) for securing to anchor (not shown). The belt may be stitched after passing around bar 16, or fixed by other means.

Release of the clasp is extremely simple. Guard 3 is raised to the open position, and portion 1 is lifted off portion 2, and the two ends of the loop are thus separated for later union if desired.

It will readily be appreciated that the embodiment of combination of clasp and loop member shown in FIGURE 3 is but one of many which could be made. Other loop members, for example bracelet bands, can be connected to ends 8 of portions 1, 2 by a hook and eye arrangement; and others yet again, for example flexible metal watchstraps, by direct soldering. Also, the guard 3 could be secured to either of the clasp portions 1, 2 and not just to portion 2, and flap 9 could be ornamented or otherwise marked at choice.

It will be seen therefore that this invention provides a new and useful improved clasp which is of a simple construction, attractive in appearance and efficient in use.

Other alterations to the general form of the clasp may be made to the invention as may occur to those skilled in the art without departing from the scope of the invention as defined in the appended claims.

I claim:
1. A clasp having two interengaging portions and a safety catch, each partion being adapted for connection at one end thereof to one end of a loop member, one interengaging portion having a single tongue member remote from said one end and inclined at an acute angle from the surface of that portion towards the one end thereof, the other interengaging portion being so defined as to form a single groove as an exact complement to said tongue member such that said tongue member will be fully enclosed within said groove when said portions are interengaged, the safety catch being in the form of a guard having a flap, and two side arms interconnected thereby, the guard being pivotally mounted towards the one end of one of the clasp portions and arranged to close and catch over the top of the two portions so as to cover the interengagement of the two portions.

2. A clasp according to claim 1 in which both interengaging portions are each defined so as to form both a single tongue and a single groove, such that when interengaged they together form a rectangular parallelepiped.

3. A clasp according to claim 1 including means for locking the guard in the open and closed positions comprising interco-operating studs and indentations, in which one set are present on said guard and one co-operating set, for open and closed positions respectively are present on each of said interengaging portions.

4. A combination of a loop member, and a clasp having two interengaging portions and a safety catch, each portion being adapted for connection at one end thereof to one end of the loop member, one interengaging portion having a single tongue member remote from said one end and inclined at an acute angle from the surface of that portion towards the one end thereof, the other interengaging portion being so defined as to form a single groove as an exact complement to said tongue member such that said tongue member will be fully enclosed within said groove when said portions are interengaged, the safety catch being in the form of a guard having a flap, and two side arms interconnected thereby, the guard being pivotally mounted towards the one end of one of the clasp portions and arranged to close and catch over the top of the two portions so as to cover the interengagement of the two portions.

5. The combination according to claim 4 in which the loop member is a wristband.

6. The combination according to claim 4 in which the loop member is a safety belt.

References Cited

UNITED STATES PATENTS

| 172,170 | 1/1876 | Read. | |
|---|---|---|---|
| 1,591,294 | 7/1926 | Donaldson. | |
| 2,126,379 | 8/1938 | Fischer | 24—232 |
| 2,203,728 | 6/1940 | Hutchinson | 24—24 X |
| 2,211,273 | 8/1940 | Kleckner | 24—232 X |
| 2,454,439 | 11/1948 | Fontaine. | |
| 3,327,362 | 6/1967 | Bousquet. | |

FOREIGN PATENTS

| 259,190 | 6/1949 | Switzerland. |
|---|---|---|
| 251,966 | 9/1948 | Switzerland. |

BERNARD A. GELAK, *Primary Examiner.*